United States Patent [19]

Bullock et al.

[11] Patent Number: 5,835,817
[45] Date of Patent: Nov. 10, 1998

[54] REPLACEABLE PART WITH INTEGRAL MEMORY FOR USAGE, CALIBRATION AND OTHER DATA

[75] Inventors: Michael L. Bullock; Winthrop D. Childers, both of San Diego, Calif.; B. Mark Hirst, Boise, Id.; Ronald D. Stephens, Jr., Escondido, Calif.; Antoni Gil Miquel, Sabadell, Spain

[73] Assignee: Hewlett Packard Company, Palo Alto, Calif.

[21] Appl. No.: 901,299

[22] Filed: Jul. 28, 1997

Related U.S. Application Data

[60] Division of Ser. No. 584,499, Jan. 8, 1996, Pat. No. 5,699,091, which is a continuation-in-part of Ser. No. 363,188, Dec. 22, 1994, Pat. No. 5,491,540.

[51] Int. Cl.⁶ .......................... G03G 15/00; G03G 15/08; B41J 29/393
[52] U.S. Cl. .................... 399/25; 347/7; 347/19; 399/12; 399/13; 399/27; 399/2
[58] Field of Search .................. 347/7, 19, 86, 347/87; 399/12, 13, 24, 25, 27, 90, 111, 113, 2, 46

[56] References Cited

U.S. PATENT DOCUMENTS

| | | |
|---|---|---|
| 4,551,000 | 11/1985 | Kanemitsu et al. . |
| 4,803,521 | 2/1989 | Honda . |
| 4,961,088 | 10/1990 | Gilliland et al. . |
| 5,016,171 | 5/1991 | Connolly et al. . |
| 5,049,898 | 9/1991 | Arthur et al. . |
| 5,137,379 | 8/1992 | Ukai et al. . |
| 5,184,181 | 2/1993 | Kurando et al. . |
| 5,272,503 | 12/1993 | LeSueur et al. . |
| 5,283,613 | 2/1994 | Midgley, Sr. . |
| 5,363,134 | 11/1994 | Barbebenn et al. ............... 347/49 |
| 5,365,312 | 11/1994 | Hillmann et al. ............... 399/12 |
| 5,410,641 | 4/1995 | Wakabayashi et al. . |
| 5,488,395 | 1/1996 | Takayanagi et al. ............... 347/7 |
| 5,506,611 | 4/1996 | Ujita et al. . |
| 5,610,635 | 3/1997 | Murray et al. ............... 347/7 |
| 5,638,097 | 6/1997 | Takayanagi et al. ............... 347/7 |
| 5,734,401 | 3/1998 | Clark et al. ............... 347/87 X |

FOREIGN PATENT DOCUMENTS

| | | |
|---|---|---|
| 0086061B1 | 6/1987 | European Pat. Off. . |
| 0720916A2 | 7/1995 | European Pat. Off. . |
| 59-61854 | 4/1984 | Japan . |
| 63-92959 | 4/1988 | Japan . |
| 2-144571 | 11/1988 | Japan . |
| 2-223963 | 9/1990 | Japan . |
| 2216437 | 10/1989 | United Kingdom . |

OTHER PUBLICATIONS

Product Description, 1995, pp. 1–4, CalComp Inc., "TechJET® 175i".

InkPac–C, CalComp Inc., pp. 1–2, "Intelligent Ink Delivery InkPac".

Hardcopy Observer, Oct., 1995, Calcomp Inc., p. 1, "Products".

Xerox Disclosure Journal, vol. 8, No. 6, Nov.–Dec. 1983, p. 503, Robert A. Lonis, "Storage of Operating Parameters in Memory Integral with Printhead".

Primary Examiner—Matthew S. Smith
Attorney, Agent, or Firm—Kevin B. Sullivan

[57] ABSTRACT

A printer/copier apparatus is adapted to receive a replacement ink cartridge that is employed during the printing/copying operation. The apparatus includes a receptacle with a first connector that is coupled to a processor which controls operation of the apparatus. The cartridge includes a second connector which mates with the first connector and a serial access memory that is connected to the second connector. Data transfers are enabled both from and to the memory to enable access and modification of data stored therein that is indicative of cartridge usage, calibration, and to parameters for controlling operation of the apparatus. The invention is applicable to replaceable apparatus used with laser and ink jet printers, copiers, etc.

26 Claims, 6 Drawing Sheets

REPLACEABLE PART WITH INTEGRAL MEMORY FOR USAGE, CALIBRATION AND OTHER DATA

RELATED PATENT APPLICATION

This is a divisional of application Ser. No. 08/584,499 filed on Jan. 8, 1996, now U.S. Pat. No. 5,699,091 which is a continuation-in-part of U.S. patent application, Ser. No. 08/363,188, filed Dec. 22, 1994, now U.S. Pat. No. 5491,540.

FIELD OF THE INVENTION

This invention relates to apparatus that employs replaceable, consumable, parts and supplies and, more particularly, to replaceable, consumable parts and supplies that include integral memory for storing usage, calibration and other data.

BACKGROUND OF THE INVENTION

Substantially all present-day copiers, printers, plotters, etc. include a controlling microprocessor which requires input calibration data for internal components so as to enable high quality production of documents. Since most such apparatus is produced so as to allow user-replacement of consumable items, entry of usage and calibration data must be performed by the user (or repair-person) who is performing the replacement operation. Any error in entry of calibration data can substantially degrade the apparatus or render the apparatus inoperative.

To determine usage of consumables, the prior art has generally been restricted to simple record-keeping entries which enable the user to know when replacement is required. For instance, copiers often display a count of the number of output pages and maintain an internal record of the number of rotations of the drum (or of an organic photoconductor web) to enable the processor to signal when service or replacement is required.

Replaceable developer modules are currently employed in many electrophotographic printers and copiers. Each developer module includes a supply of toner and toner carrier along with a mechanism to bring the toner/carrier mixture to a drum (or web) surface. To provide proper control signal levels for a laser exposure system, the control microprocessor adjusts the ratio of toner to carrier so as to achieve a proper mixture. One method for controlling the toner-to-carrier ratio is to provide an oscillator circuit whose frequency is varied by the toner-to-carrier ratio. Upon an initial installation of a new developer module, the control processor takes a number of minutes to accumulate sufficient data from the oscillator circuit to determine the toner-to-carrier ratio so as to enable a setting of the proper signal levels in the laser exposure system. If the developer module is removed from the apparatus or is transferred to another apparatus, the entire calibration procedure must be repeated.

While, as above indicated, printers and copiers have heretofore retained an output page count, such a raw page count does not take into account different wear levels created by different media types. For instance, a fuser assembly (which includes a pair of platen rollers, one or both being heated) manifests a surface breakdown phenomenon after approximately 80,000 pages of a standard media type. Different media types cause a variation in fuser assembly wear and a simple page count does account for such variations.

Fuser assemblies used with color printers employ a silicone oil to increase color saturation level and to provide a glossy finish to printed media sheets. Different media types require variations in the amount of applied oil. A control system is provided to enable the fuser assembly to know the particular type of media sheet so as to enable a determination of the amount of oil to be deposited. While the processor maintains track of cumulative oil usage, if the fuser assembly is removed or the stored data regarding oil usage is lost, there is no way to reconstruct the usage state of the fuser assembly when it is put back into service.

In a similar fashion, an electrophotographic drum includes a photosensitive layer that manifests a determined charge sensitivity. Such charge sensitivity data is employed as a control parameter in the power control loop of the laser exposure system. Heretofore, such charge sensitivity data has been entered by the operator. If, however, the drum is transferred between printers, as may happen during servicing, such data does not travel with the drum but must be reentered.

Ink jet printers employ disposable printheads with integral ink supplies. U.S. Pat. No. 5,049,898 to Arthur et al., assigned to the same Assignee as this application, discloses a disposable printing assembly wherein an integral memory element stores data that characterizes the assembly. Arthur et al. provide an ink jet printhead assembly with a memory which designates the color of ink in the print head, its amount, and the position of the ink jet orifice plate on the print head body. This data is read from the print head by a read/write element in the printer and is then used or displayed, as desired.

Ink jet printers employ a number of parameters (from an installed printer driver) to enable reliable operation of the printhead and continued production of high quality print jobs. As is known, thermal ink jet printheads employ a heater resistor at each ink jet orifice which, upon energization, causes the ejection of one or more ink drops. The amount of current applied to a heater resistor to achieve a desired ink drop volume is determined by a combination of factors and is the product of a calculated algorithm. Drop volume is dependent upon sensed temperature, constants that reflect the ink's characteristics, the structural arrangement of the ink orifice, etc. Those parameters are provided by the printer driver to the ink jet printer, upon power-up.

If it is determined by the manufacturer, that such parameters require modification, the manufacturer must issue a printer driver update and arrange to supply that update to both previous and current customers. Further, if the design of a printhead is changed during manufacture, such change will often require alterations to the parameters. Here again, a new printer driver is required.

Many consumable, replacement parts for printers/copiers include a fuse that is integral to the replacement part and identifies whether the replacement part is new or used. If, upon insertion of the replacement part, the controlling microprocessor determines that the fuse is intact, the machine determines that the replacement part is new and zeros out its count values which indicate the remaining usable life for the part. When further input data concerning the replacement part is required, the microprocessor either indicates the need for such data to the user via a control panel or automatically gathers the data from a replacement part sensor (as in the case of the toner-to-carrier ratio in a developer module). Thereafter, the fuse is blown.

Figure 1:
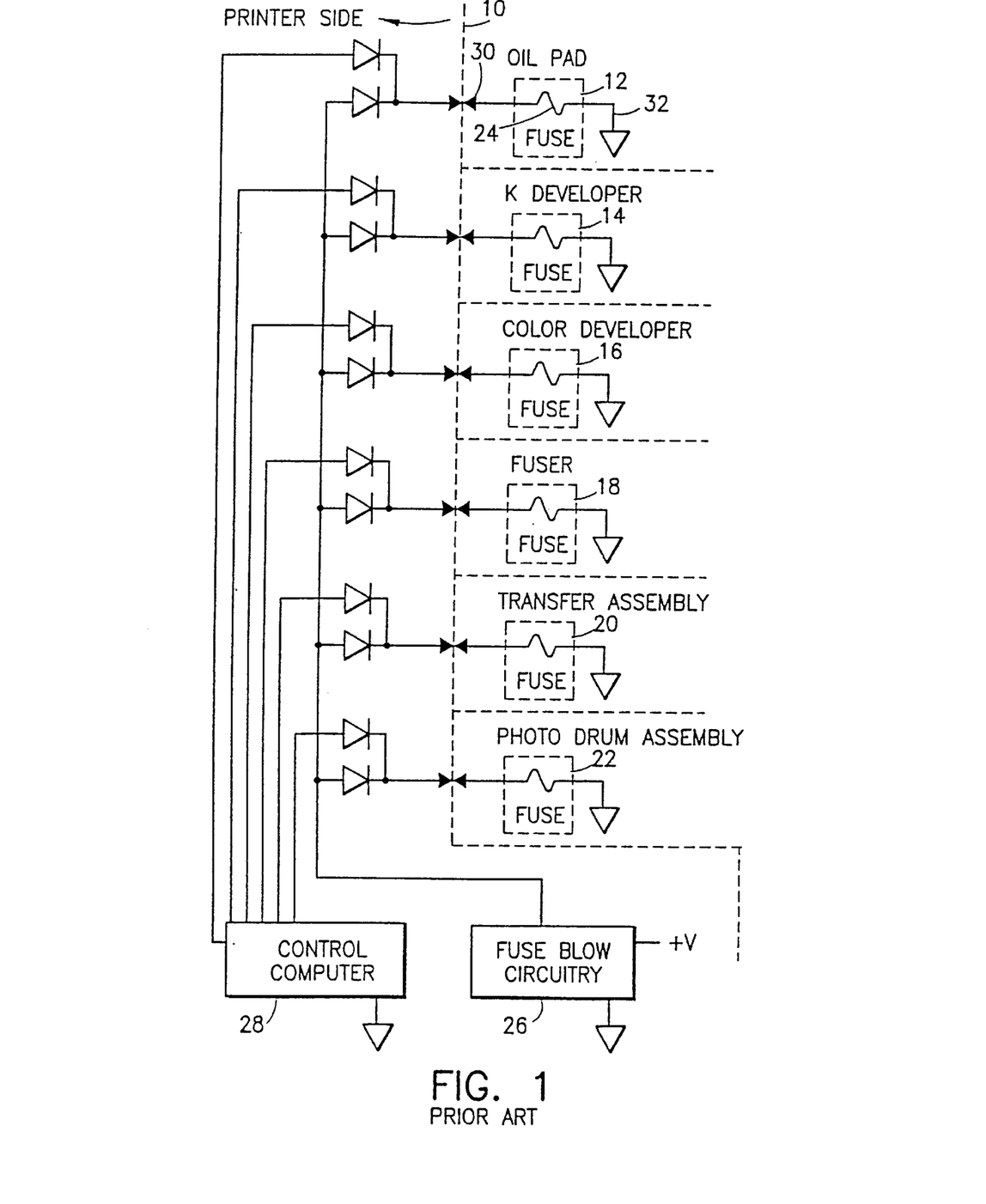
FIG. 1 is a block diagram of a prior art apparatus wherein each replaceable part includes an integral fuse that is wired to an interface connector via a single wire.

Such a prior art circuit is shown in FIG. 1 for an electrophotographic printer wherein each of a plurality of consumable parts are plug connected to a printer at an interface 10. The plug-connected consumable items include an oil pad module 12, a black (K) toner developer module 14, a color developer module 16, a fuser assembly 18, a transfer assembly 20, and a photographic drum assembly 22. Those skilled in the art will realize that there are other additional consumable items which can also be plug connected to a printer, in addition to the aforementioned consumable parts. Each consumable item includes a fuse 24 that is blown by fuse blow circuitry module 26 upon completion of a calibration action by control computer 28. Fuse 24 is incorporated into the structure of each of the replacement items and is connected via a single wire to a contact 30 in a multiple contact connector, which interfaces with a connector in the printer. A ground connection 32 within the replacement item enables a complete circuit to be made through fuse 24.

It is an object of this invention to provide a replaceable part/consumable with an integral memory that enables both usage and calibration data to be stored and altered.

It is another object of this invention to provide a replaceable part/consumable with a memory module that requires no modification to a pre-existing physical interface between the part/consumable and apparatus in which the part/consumable is placed.

SUMMARY OF THE INVENTION

An ink jet printer/copier apparatus is adapted to receive a replacement ink cartridge that is employed during the printing/copying operation. The apparatus includes a receptacle with a first connector that is coupled to a processor which controls operation of the apparatus. The cartridge includes a second connector which mates with the first connector and a memory that is connected to the second connector. Data transfers are enabled both from and to the memory to enable access and modification of data stored therein that is indicative of cartridge usage, calibration, and to parameters for controlling operation of the apparatus. Usage of a serial access memory on the cartridge, which enables input/output over a single wire, enables a direct substitution of the memory in place of a presently provided fuse, without requiring changes to the physical interface between the cartridge and the connectors which enable mating of the cartridge with the apparatus.

DETAILED DESCRIPTION OF THE INVENTION

Hereafter, the invention will be described in the context of an electrophotographic printer and an ink jet printer, however, it is to be understood that the invention is applicable to any computer-controlled apparatus that includes replaceable parts/consumables.

As will be understood, the invention enables usage and calibration data to be stored in a single wire memory module that is incorporated into a replaceable part. Thus, if the replaceable part is transferred from first apparatus to second apparatus, the second apparatus is enabled to adjust its control parameters in accordance with the data stored in the part's on-board memory. This is critical when data from the replaceable part must be interrelated with other data to enable derivation of apparatus control signals. For instance, humidity data that is internally sensed within a printer, when combined with a photoconductor's sensitivity data, directly influences the laser's exposure settings. If incorrect photoconductor sensitivity data is utilized, printer performance is adversely affected.

Recently, single wire input/output, serial memories have become available in the marketplace. One such memory family comprises the DS1992–DS1995 Touch Memories from Dallas Semi-Conductors Inc. Each of those memories is configured as a nonvolatile, random-access memory with storage sizes which range from 1K–16K bytes. In the case of the DS1992, the internal 128 bytes of nonvolatile RAM are organized as four storage areas of 32 bytes each and a scratch pad of 32 bytes. Data input and output from the one wire memory is accomplished via a protocol wherein various length pulses are employed which evidence the beginning of a read/write action. Those pulses are followed by bit-by-bit transfers, wherein ones and zeros are manifest by different pulse lengths. Other serial input/output memories are also usable with this invention.

Electrophotographic Printer

Figure 2:
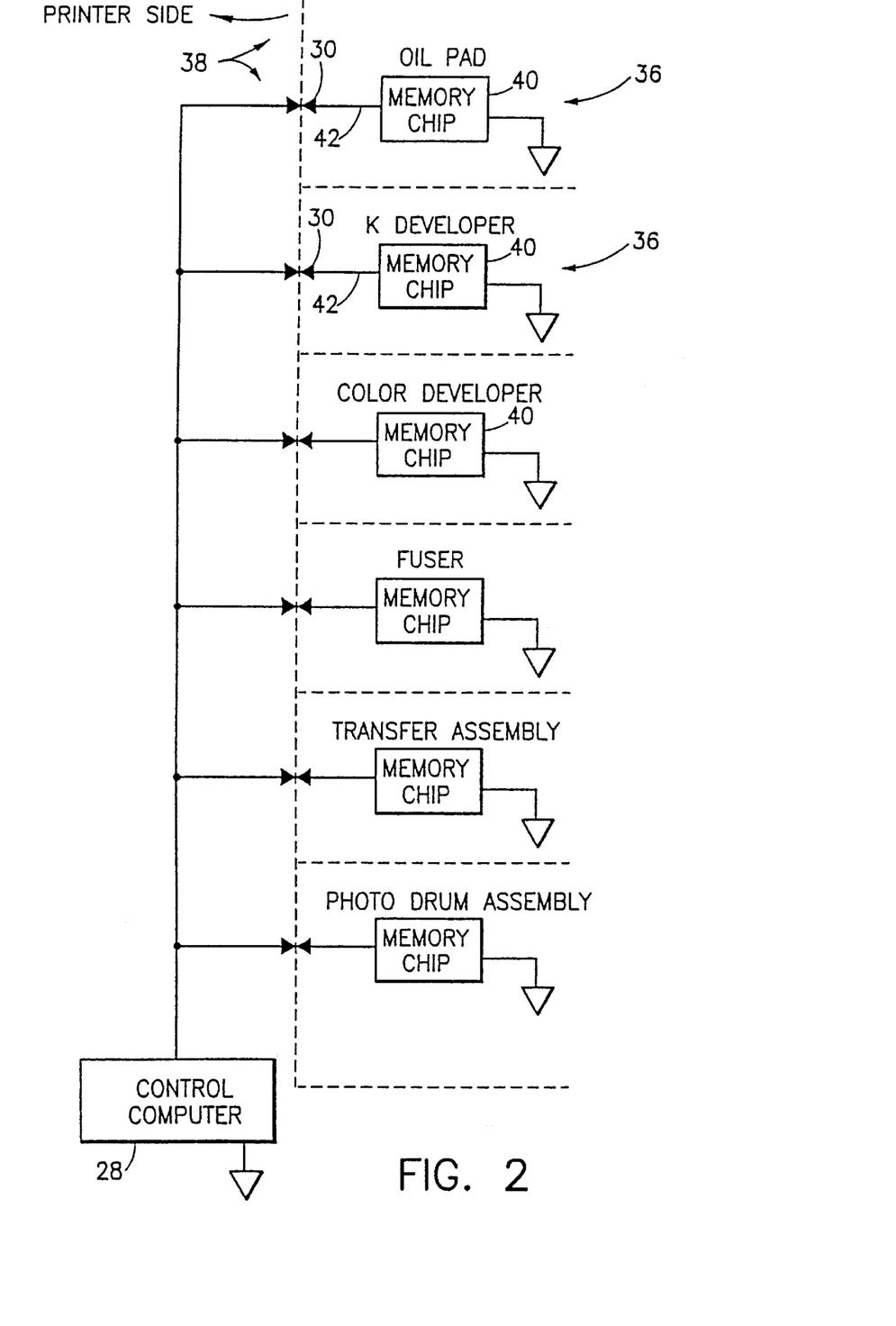
FIG. 2 is a block diagram that illustrates the invention.
Figure 3:
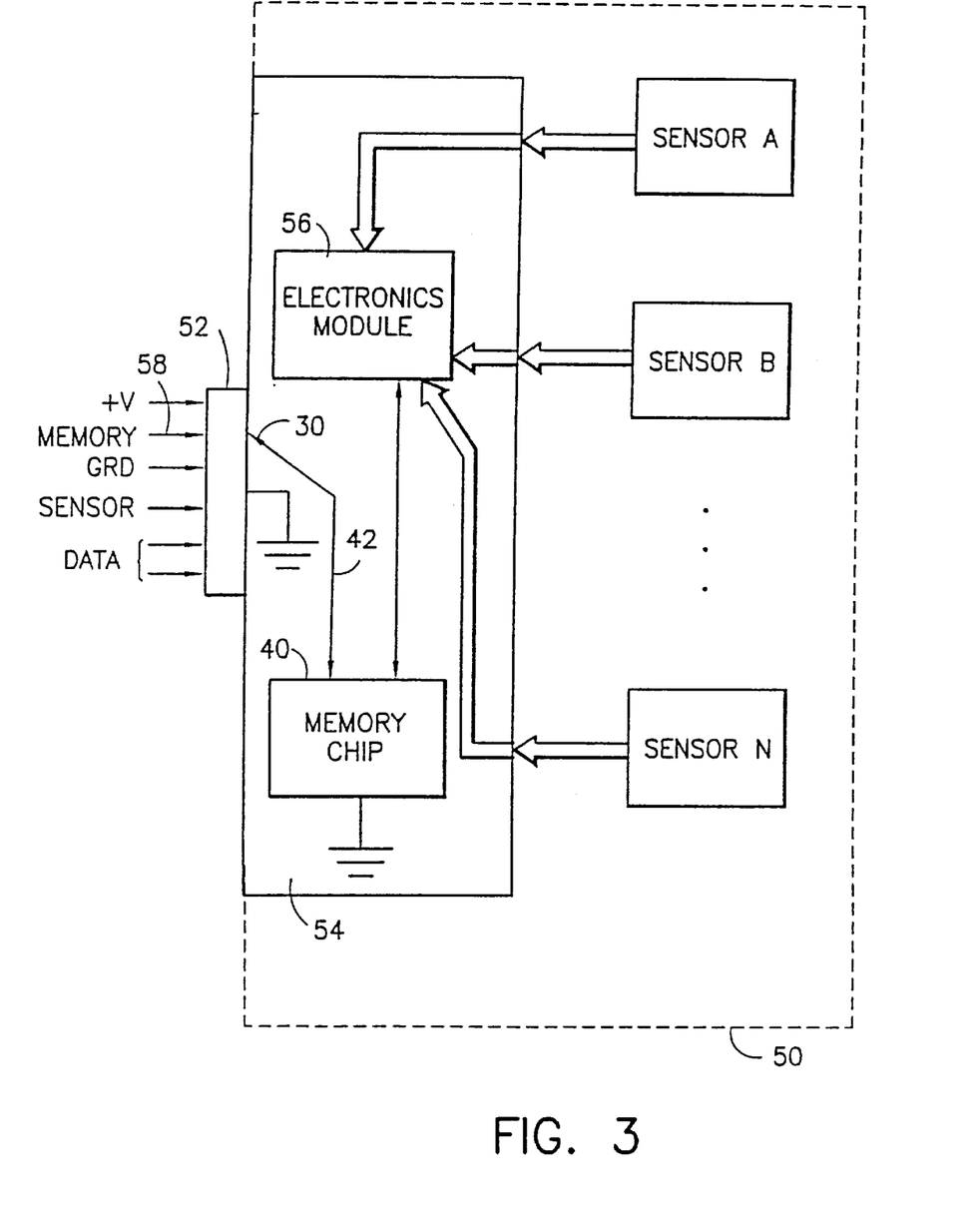
FIG. 3 illustrates further detail of an interface portion of a replaceable part, showing a one wire interconnection for an on-board serial access memory.

Referring to FIG. 2, each replaceable part/consumable mates with a receptacle 36 (shown schematically) within a printer 38. Each of the fuses shown in FIG. 1 have been replaced by a memory chip 40 which connects to the preexisting connector 30 via a wire 42 and enables storage of both usage and calibration data regarding the replaceable part. In FIG. 3, a further detailed view is shown of an interface between a replaceable part 50 and a connector 52 within a printer. Replaceable part 50 includes a plurality of sensors A-N that are interconnected with an interface board 54 on which one-wire memory chip 40 and electronics module 56 are mounted. (Most of the interconnections on board 54 are not shown to avoid an over-complication of the view.) Sensors A–N feed signals to electronics module 56 which provides an interface function to connector 52 and the various control and sense lines that are connected thereto. Line 42 from one-wire memory chip 40 is connected via contact 32 to memory line 58 which is, in turn, connected to control computer 28 so as to enable both reading and writing actions with respect to memory chip 40.

In order to enable control computer 28 to identify the particular replaceable part, it is preferred that blocks of serial numbers be preassigned to replaceable part types. Control computer 28 is pre-loaded with appropriate data that enables identification of the particular replaceable part, simply by reading the serial number stored in memory chip 40 carried by the replaceable part.

During operation of the printer, control computer 28 is periodically activated to cause outputs from sensors A–N to be recorded so as to enable use of the sensed data in rendering system adjustments. In this regard, data from plural memory chips are correlated so as to enable more accurate adjustments than heretofore. For example, as indicated above, fuser assemblies have determined the amount of silicone oil to apply to a media sheet in dependence upon the type of media sheet being fed. Prior art systems have employed a light sensor to detect the reflectivity of the media sheet in order to alter a silicone oil deposition rate. As the silicone oil is contained in a sponge-like media, the fuser assembly rollers are slowed to achieve a greater silicone oil deposition upon selected types of media sheets. Currently, EP printers slow the fuser rollers by approximately 50% when overhead transparencies are fused. This slow down roughly doubles the amount of silicone oil deposited. Through the use of this invention and detailed knowledge of past silicone oil usage—as derived from data stored. in a memory chip 40, the temperature of the fuser rollers can be increased to increase the silicone oil release rate to obtain a desired color saturation level—without decreasing the roller speed. Thus, with precise knowledge of past silicone oil usage history, the temperature of fuser rollers can be altered by control computer 28 to allow the fuser system to operate at full speed while the silicone oil is being deposited at the higher temperature.

In a similar manner, data can be stored in a memory chip 40 which enables more accurate control in response to developer module parameters. Presently, the only information stored by control computer 28 regarding a color developer module is a sensor offset, a page count, and a humidity value. The sensor offset is used to control the toner-to-carrier ratio. Page count is used to also modify the toner-to-carrier ratio to compensate for aging of the developer's mechanical assemblies and aging of the carrier, per se. It will be recalled that the carrier is a magnetic material used to convey toner and helps develop proper electrostatic charges on the toner particles.

Memory chip 40 will preferably store additional data regarding developer module parameters that affect image production. Those parameters will include: developer magnet strength; absolute distance between the developer sleeve and the photoconducting drum; developer surface roughness and absolute magnet angle. Each of the aforesaid parameters directly affects development quality and will enable control computer 28, upon determining the aforesaid stored parameters, to more accurately compensate for variations thereof. Similarly, a memory chip 40 associated with a drum would record a parameter defining the drums' photosensitivity (i.e. charge and discharge characteristics). Control computer 28 will compensate for variations in that parameter by adjusting toner carrier ratio, laser power and bias settings for both the developer module and the drum photoconductor.

Further, carrier particles employed with the toner exhibit a charge-to-mass ratio which is a measure of the carrier's ability to impart a charge to the toner. Such charge-to-mass ratio is recorded after manufacture and a low charge-to-mass ratio means that there is less control of the toner and that it is emplaced more easily on the drum. Such charge-to-mass ratio, as measured by the manufacturer, can be stored in a memory chip 40 attached to each developer module. Upon initialization, a printer would adjust a number of settings in the printer to compensate for a charge-to-mass ratio which falls outside of an expected range (e.g., the toner-to-carrier ratio could be altered, the drum bias setting changed, the laser power setting or the developer bias setting altered etc.).

Upon receiving updated sensor data and performing the necessary calculations, control computer causes revised usage and/or calibration data to be written to the respective memory chips 40 to update their memory states. Thus, if a replaceable part from a first printer is transferred to a second printer, control computer 28 in the second printer is enabled to access the usage and calibration data of the newly substituted replaceable part and to accurately adjust its operating states in accordance therewith.

Ink Jet Printer

Figure 4:
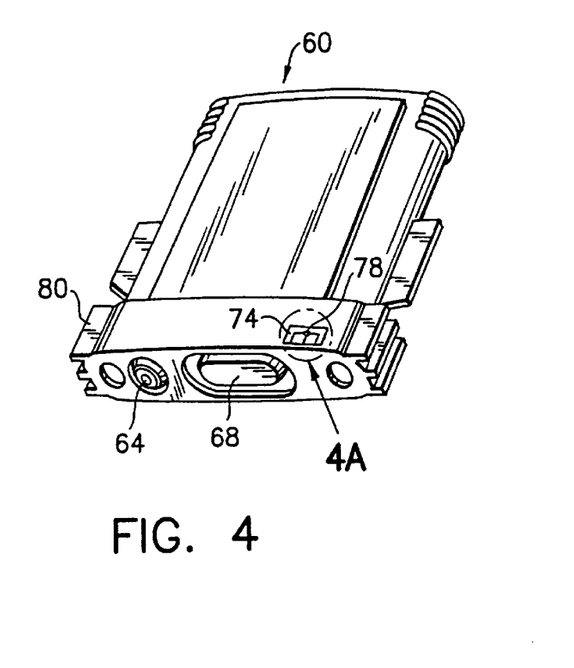
FIG. 4 is a perspective view of a replaceable ink cartridge for an ink jet printer.
Figure 4A:
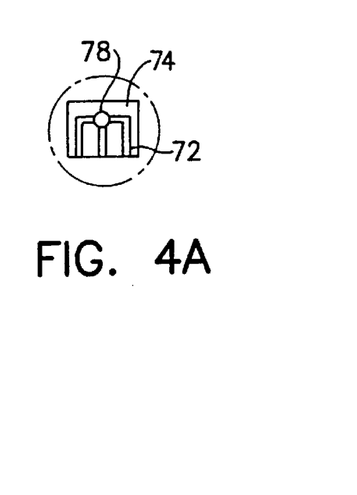
Figure 5:
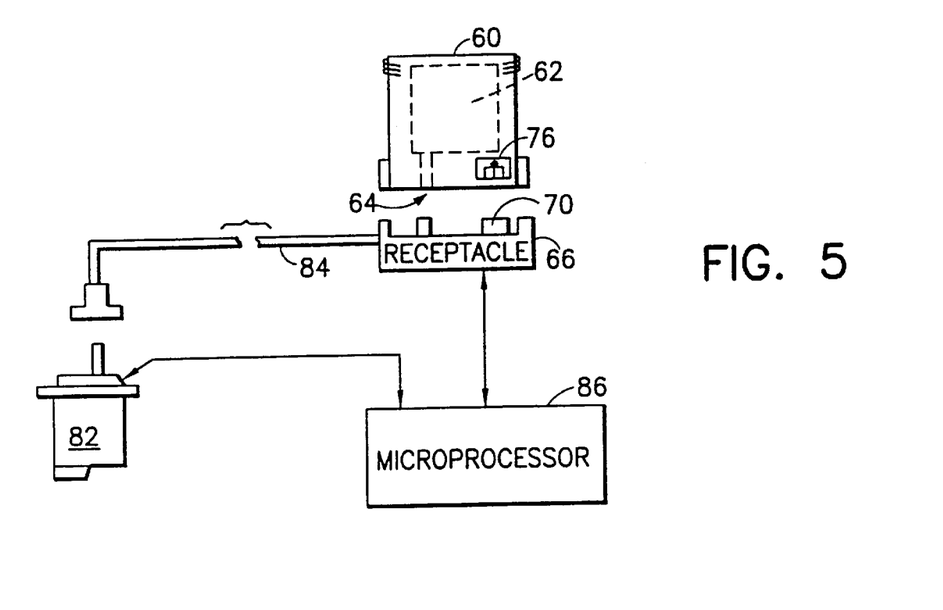
FIG. 5 is a schematic diagram illustrating apparatus for interconnecting the ink cartridge of FIG. 4 to an ink jet printhead and, further, for making connection to a memory chip resident on the ink cartridge.

Referring now to FIGS. 4 and 5, an ink jet print cartridge 60 includes an internal reservoir 62 for holding a supply of ink. A fluidic interconnect 64 enables a receptacle 66 to receive ink from cartridge 60. A diaphragm 68 also interconnects with an actuator in receptacle 66 (not shown) for pressurizing ink supply reservoir 62. An electrical 3 interconnect 70 makes connection with at least one contact land 72 on a circuit substrate 74. A serial memory chip 76 (FIG. 5) is positioned on circuit substrate 74 and is covered by an overcoat 78. Memory chip 76 enables input/output of data over a single access wire. Ink cartridge 60 includes keying features 80 which mate with additional keying features on receptacle 66 to assure that ink cartridge 60 can only be inserted if it is the correct ink color, has an ink that is compatible with the printer system and is positioned in the proper orientation. Receptacle 66 is fluidically connected to an ink jet pen 82 via a conduit 84. Both ink jet pen 82 and receptacle 66 are electrically connected to a microprocessor 86 which controls the operation of the ink jet printer.

As is known, the operation of ink jet pen 82 is controlled by microprocessor 86 in accordance with various parameters derived from a printer driver. Among those parameters are default drop firing frequencies (i.e., high quality mode, draft mode); a parameter which determines the pulse width of a signal applied to individual heater resistors; a parameter for controlling an amount of pre-warm current to the print head to enable optimum and stable printhead temperature during printing operations; a parameter designating the number of drops to be ejected per pixel; service station parameters; print mode data (i.e., parameters enabling the printer to achieve a specified print quality and print appearance; and an algorithm which enables the amount of ink used and remaining, to be determined.

The pulse width parameter determines the thermal inkjet resistor firing energy, as the applied voltage is usually kept constant. The parameter controlling prewarm current enables control of substrate temperature and thus drop volume. By modulating the prewarm current, drop volume variations which cause a variation in print quality can be avoided. Print mode parameters control the geometry of the dot array.

At least some of the above-noted parameters and procedures are, in addition to being present in the printer driver, stored on memory chip 76. At each commencement of a print job, microprocessor 86 interrogates the contents of memory chip 76 and alters the stored parameters of the printer driver in accordance with the accessed data. Thereafter, the ink jet printer is enabled to operate in accordance with those parameters in the known manner.

An important feature of this invention is that ink cartridge 60 is the most often replaced unit in an ink jet printer. Thus, if an alteration to parameters or modification of an algorithm, is required as a result of an engineering change to the printer, the revised parameters can be inserted into memory chip 76 upon manufacture of ink cartridge 60. When cartridge 60 is thereafter purchased by a user and inserted into the ink jet printer, all of the changed parameters are automatically made available to microprocessor 86—achieving an updating of the operation of the ink jet printer without requiring special efforts to distribute modified printer drivers. As a result, over a short period of time, all installed ink jet printers are updated to the most recent parameter and algorithm set, simply through the act of purchase of replacement ink jet cartridges 60.

Among the parameter data contained in memory chip 76 may be the following: actual count of ink drops emitted from the cartridge; date code of the ink supply; date code of. initial insertion of the ink cartridge; system coefficients; ink type/color; cartridge size; print mode; temperature data and heater resistor parameters; age of the cartridge; drop count for the print head; a pumping algorithm; printer serial number; cartridge usage information, etc.

Such data enables microprocessor 86 to perform a number of control functions within the ink jet printer. For instance, microprocessor 86 calculates an estimate of remaining ink in cartridge 60 and compares the estimate against pre-recorded supply thresholds. If the ink is found to be less than 25% of full capacity, a message is provided to the user indicating that fact. Further, when a substantial portion of the last 25% of ink is consumed, microprocessor 86 can disable the ink jet printer (and to further enable the user to override the disablement), while simultaneously recording the fact of the override in memory chip 76.

The data stored in memory chip 76 can further enable microprocessor 86 to determine that the proper ink type and color is installed; provide a warning to the user about a possible shelf life expiration and further provide the user with a warning against use of the ink. By coding the memory with an ink supply identifier, the printer'can determine when the supply will run out of ink. Thus, the printer can begin attempting an out-of-ink determination at a strategic point of time—rather than running the procedure continuously. With respect to out of ink detect, low ink warning, and printer feedback functions, before starting a print job, the printer will read the supply size (among other parameters) from the ink cartridge. It will compare the read parameters with an estimate of the amount of ink consumed. The first time a cartridge is used (for a particular color), the printer will have to assume a conservative (large) value for the drop volume. Later, when the printer/computer determines that the ink level is low, it will fire into a spittoon, detecting the thermal rise from a thermal sense resistor (TSR). The temperature will tend to spike up more when the ink supply is near empty. When the supply is actually empty, the printer uses that information to recalculate the drop volume. In this way, the printer "learns" and becomes more accurate at drop counting. A conservative way to use this information is to take an intermediate point between the value calculated and the initial conservative drop volume value. Over time, the value used for drop counting will approach the calculated value for all supplies used. In addition, as drop volumes become better controlled and understood, the initial conservative drop volume estimate programmed into the memory can be updated.

With respect to printer serial number and usage information, the printer is enabled to update the data which records the type of usage (average print density, etc.) A mail-in program of used cartridges allows the manufacturer to gather marketing information about how the printers are being used. From this information, parameters on the chip can be further optimized. One way to store usage information is for the printer to store information on average print density and amount of ink consumed for each page printed. Other metrics, such as percent graphics and test can be stored. The printer/driver then condenses the information and stores it as a series of numbers on the cartridge near the end of the supply life.

With respect to storage of the dot placement correction algorithm on the cartridge, as more information regarding ink jet pen production is obtained, a more accurate method for correcting of dot placement errors can be derived. For example, in the scan direction, variations in the nozzle trajectories cause the dots to vary in placement. Such variations are known as SAD (scan axis directionality) errors. Such variations can be compensated by changing the timing of nozzle firing—a parameter on the cartridge.

The ink pump which actuates the cartridge may fail due to fatigue. Thus, by recording the number of cycles seen by the pump on the cartridge memory, such failure can be anticipated. If the pump is used too much, then the pumping is reduced or stopped in order to prevent an ink spill. Thus, the maximum throughput (ml of ink per minute) can be reduced to accommodate the reduction or elimination of pumping. Additionally, since pump life may improve over with improved manufacturing techniques, an estimate of pump life recorded in the cartridge memory can be updated.

Since drop volume per impulse of a heater resistor is determined by an algorithm which is, in turn, dependent upon system parameters, the revised parameters enable is optimal calculation of drop volume. Since the parameters can be continuously updated during the life of the printer, as new ink cartridge are installed, optimal print quality is achieved. Further, pulse widths, pulse warming energy, variations in the number of drops per pixel, etc. all may be altered and controlled in accordance with system improvements.

Figure 6:
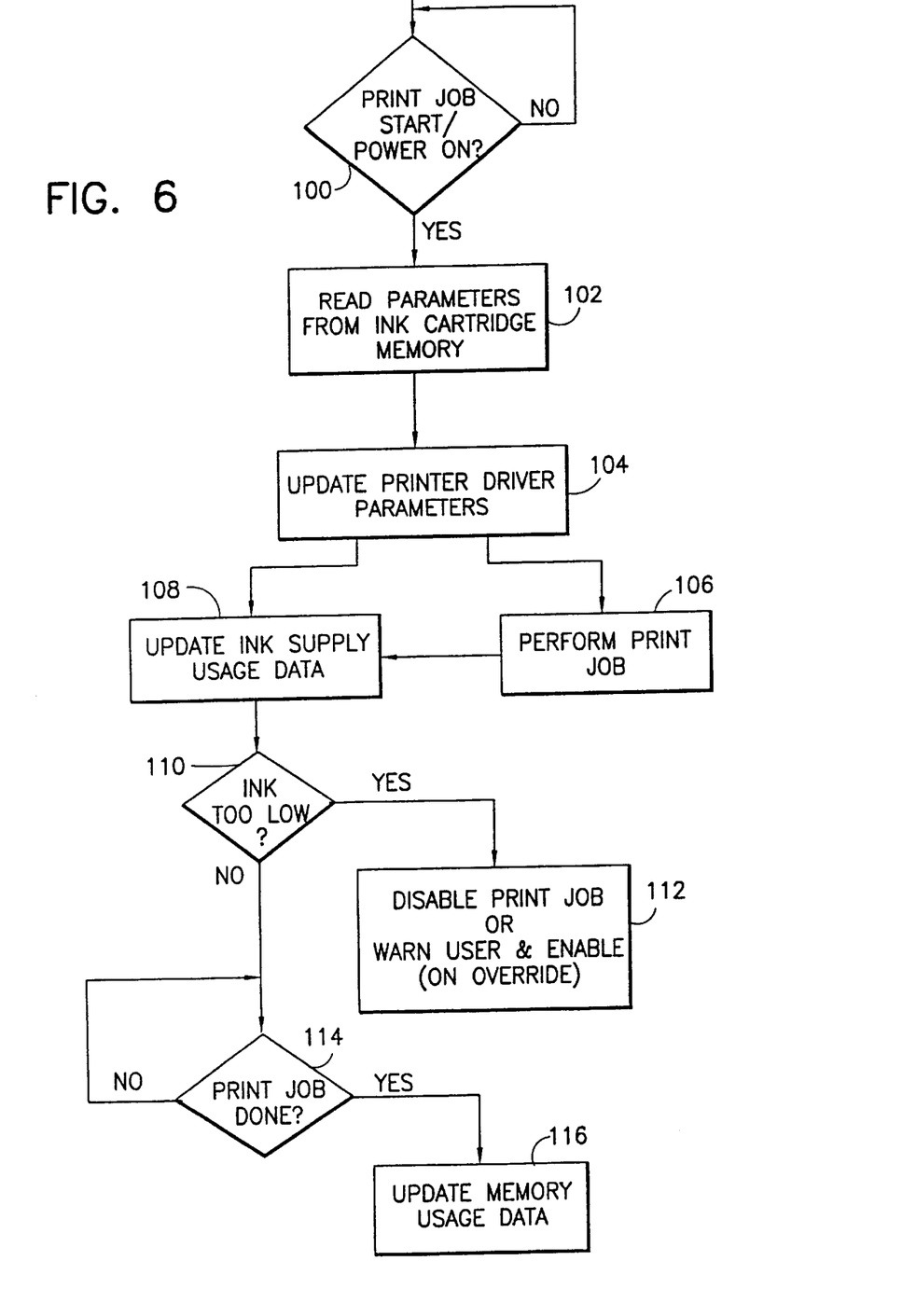
FIG. 6 is a logic flow diagram illustrating the operation of the printer system of FIG. 5 in accordance with data stored on an ink cartridge.

Turning to FIG. 6, the logic diagram shown therein illustrates the interaction of the ink jet printer with the data stored on memory chip 76. At power up or when a print job starts (decision box 100), the system parameters are read from ink cartridge memory chip 76 (box 102). Those parameters are then used to update the printer driver default parameters (box 104) and the printer then employs the default pulse width, pulse warming energy, firing frequency and multi-drop count to control print quality (box 106).

As printing progresses, microprocessor 86 employs the drop volume coefficients, drop count and temperature measurements to estimate ink usage. Periodically, the ink usage quantity in memory chip 76 is updated (box 108) and if the ink supply is found to be too low (decision box 110), a warning message is provided to the user or, in the alternative, the print job may be thereafter disabled—subject to override (box 112). Upon completion of the print job (decision box 114), revised parameters are written back to memory chip 76 in readiness for the next operation of the ink jet printer (box 116).

Figure 7:
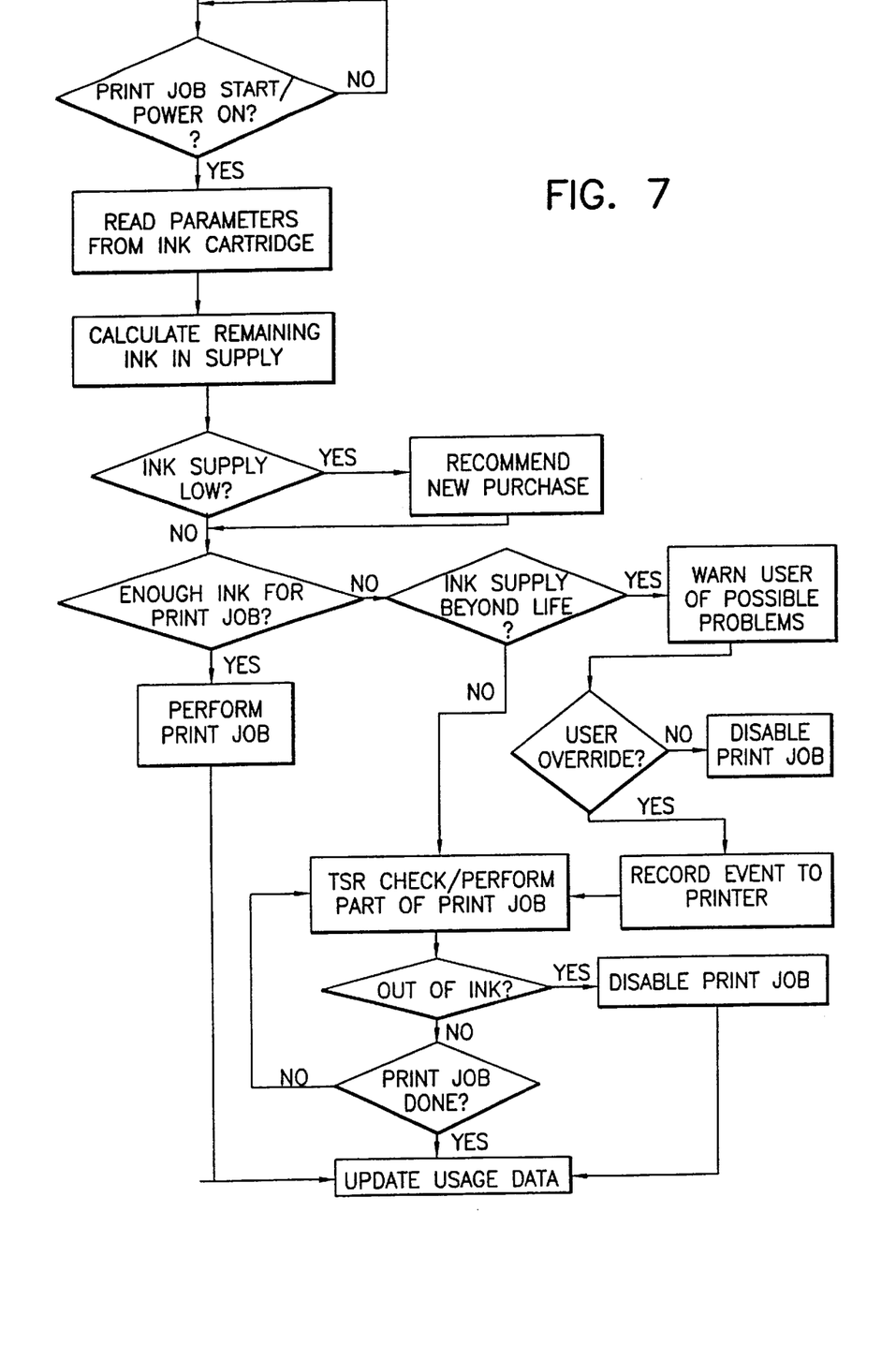
FIG. 7 is a logic flow diagram illustrating the operation of the printer system of FIG. 5 in accordance with ink usage data stored on an ink cartridge.

FIG. 7 illustrates further details of the procedure employed by the printer with respect to ink usage parameters derived from the ink cartridge.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A replaceable cartridge for providing marking material to a printer, the printer of the type having a printhead for depositing marking material on media and a controller for controlling the printer, the printer having a receptacle that includes a first electrical connector coupled to the controller, the replaceable cartridge including:

a second electrical connector configured for connection to the first electrical connector upon the insertion of the replaceable cartridge into the receptacle; and a serial access memory connected to the second electrical connector, the serial access memory having a single conductor for transferring data between the serial access memory and the controller relative to a common reference.

2. The replaceable cartridge of claim 1 wherein the replaceable cartridge is an ink container for providing ink to an ink-jet printhead.

3. The replaceable cartridge of claim 1 wherein the serial access memory contains marking material usage information for the replaceable cartridge.

4. The replaceable cartridge of claim 1 wherein the serial access memory contains information indicative of the identity of the replaceable cartridge.

5. The replaceable cartridge of claim 1 wherein the serial access memory provides parameter information for altering printer parameters.

6. The replaceable cartridge of claim 5 wherein the printer is an electrophotographic printer and wherein the parameter information includes toner cartridge parameter information.

7. The replaceable cartridge of claim 6 wherein the printer is an ink-jet printer and wherein the parameter information includes service station parameter information.

8. The replaceable cartridge of claim 1 further comprising a supply of marking material in said cartridge.

9. The replaceable cartridge of claim 8 wherein the supply of marking material is ink.

10. A replaceable marking material cartridge for a printing system, the printing system of the type that deposits marking material on media, the replaceable marking material cartridge including:

a container for holding a supply of marking material;

a serial access memory device for storing information related to the replaceable marking material cartridge; and a serial link connected to the serial access memory upon insertion of the replaceable marking cartridge into the printing system for linking the serial access memory device with the printing system, the serial link characterized by transferring information between the serial access memory and the printer in both directions along the serial link.

11. The replaceable ink marking material cartridge of claim 10 wherein the marking material is dry toner.

12. The replaceable ink marking material cartridge of claim 10 wherein said marking material includes ink-jet ink.

13. A printing system of the type having a replaceable marking material container, the marking material container providing marking material to a printer portion for selectively depositing marking material on media, the printing system comprising:

a marking material container for providing marking material to the printer portion, the marking material container including a serial access memory device for exchanging information between the marking material container and the printer portion; and a receptacle associated with the printer, the receptacle configured for receiving the marking material container, with the marking material container properly inserted into the receptacle a first connector associated with the marking material container engages a second connector associated with the printer portion to establish a serial link for transferring information in both directions between the printer portion and the serial access memory device.

14. The printing system of claim 13 wherein information transferred between the printer portion and the serial access memory device includes usage information for marking material in the marking material container.

15. The printing system of claim 13 wherein information transferred between the printer portion and the serial access memory device includes container identity information for the marking material container.

16. The printing system of claim 13 wherein information transferred between the printer portion and the serial access memory device includes parameter information for the printer portion.

17. The printing system of claim 13 wherein information transferred between the printer portion and the serial access memory device includes parameter information for the servicing of the printer portion.

18. The printing system of claim 13 wherein information transferred between the printer portion and the serial access memory device includes product date information for the marking material container.

19. The printing system of claim 13 wherein information transferred between the printer portion and the serial access memory device includes container size information for the marking material container.

20. A method for providing information to a printer of the type having a replaceable container for providing marking material to the printer, the printer depositing marking material on media, the method comprising:

providing a replaceable container having a serial access memory associated therewith, the replaceable container configured for insertion into a receptacle associated with the printer, the replaceable container having a first electrical connector electrically connected to the serial access memory that forms a serial connection with a second electrical connector associated with the receptacle if the replaceable container is properly inserted into the receptacle; and storing information relating to the replaceable container on the serial access memory so that upon insertion of the replaceable container into the receptacle a serial communication link is established between the printer and the replaceable container for transferring information in both directions using the same serial communication link.

21. The method of claim 20 wherein information transferred between the printer portion and the serial access memory includes usage information for marking material in the marking material container.

22. The method of claim 20 wherein information transferred between the printer portion and the serial access memory includes container identity information for the marking material container.

23. The method of claim 20 wherein information transferred between the printer portion and the serial access memory includes parameter information for the printer portion.

24. The method of claim 20 wherein information transferred between the printer portion and the serial access memory includes parameter information for the servicing the printer portion.

25. The method of claim 20 wherein information transferred between the printer portion and the serial access memory includes product date information for the marking material container.

26. The method of claim 20 wherein information transferred between the printer portion and the serial access memory includes container size information for the marking material container.

* * * * *